United States Patent [19]

Elrod et al.

[11] Patent Number: 4,719,480

[45] Date of Patent: Jan. 12, 1988

[54] SPATIAL STABLIZATION OF STANDING CAPILLARY SURFACE WAVES

[75] Inventors: Scott A. Elrod, Menlo Park; Butrus T. Khuri-Yakub, Palo Alto; Calvin F. Quate, Stanford, all of Calif.

[73] Assignee: Xerox Corporation, Stamford, Conn.

[21] Appl. No.: 853,253

[22] Filed: Apr. 17, 1986

[51] Int. Cl.[4] .......... G01D 15/16

[52] U.S. Cl. .......... 346/140 R; 239/102.2; 310/323; 310/328; 310/334

[58] Field of Search .......... 346/140, 75, 1.1; 239/4, 102.2; 310/334, 323, 328

[56] References Cited

U.S. PATENT DOCUMENTS

| | | | |
|---|---|---|---|
| 3,211,088 | 10/1965 | Naiman | 346/140 X |
| 4,275,290 | 6/1981 | Cielo | 346/140 X |
| 4,308,547 | 12/1981 | Lovelady et al. | 346/140 |

OTHER PUBLICATIONS

Greanias, E. C.; Hydraulic-Electrostatic Printer, IBM TDB, vol. 13, No. 5, Oct. 1970, pp. 1131-1132.

W. Eisenmenger, "Surface Tension of Water, " *Acustica*, vol. 9 1959 pp. 327-340.

Boucher, et al., "The Fundamentals of the Ultrasonic Atomization of Medicated Solutions, " *Annals of Allergy*, Nov. 1968, vol. 26, pp. 591-600.

Kenneth E. Bean, "Anisotropic Etching of Silicon," *IEEE*, vol. ED25, No. 10, Oct. 1978.

*Primary Examiner*—Joseph W. Hartary

[57] ABSTRACT

Provision is made spatially stabilizing standing capillary surface waves in fixed and repeatable locations with respect to stationary external references. For spatially stabilizing such a wave on the free surface of a volume of liquid, the wave propagation characteristics of the free surface of liquid are periodically varied in a spatially stable manner at a spatial frequency equal to the spatial frequency of the standing wave or a subharmonic thereof, thereby locking the crests and troughs of the standing wave in predetermined spatial locations. A spatially periodic pattern of notches in a wall or base plate bounding the free surface of the liquid may be employed to physically modulate its wave propagation characteristics at a suitable spatial frequency. Alternatively freely propagating secondary capillary surface waves may be launched from spatially periodic sites along the free surface of the liquid to actively modulate its wave propagation characteristics at the diesired spatial frequency.

15 Claims, 10 Drawing Figures

SPATIAL STABLIZATION OF STANDING CAPILLARY SURFACE WAVES

FIELD OF THE INVENTION

This invention relates to methods and means for spatially stabilizing standing capillary surface waves in fixed and repeatable locations with respect to stationary external references. The invention may be applied, for example, to standing capillary surface wave liquid ink printers for locking the crests of the surface wave in preselected locations with respect to a scanning-type or a discrete addressing mechanism, thereby enabling the addressing mechanism to eject droplets of ink from selected crests of the capillary wave on command.

BACKGROUND OF THE INVENTION

Ink jet printing has the inherent advantage of being a plain paper compatible, direct marking technology. However, the technology has been slow to mature, at least in part because most "continuous stream" and "drop on demand" ink jet print heads include nozzles. Although steps have been taken to reduce the manufacturing costs and increase the reliability of these nozzles, experience suggests that the nozzles will continue to be a significant obstacle to realizing the full potential of the technology.

Nozzleless liquid ink print heads have been proposed to avoid the cost and reliability disadvantages of conventional ink jet printing while retaining its direct marking capabilities. See, for example, Lovelady et al. U.S. Pat. No. 4,308,547, which issued Dec. 24, 1981 on a "Liquid Drop Emitter." Also see a copending and commonly assigned U.S. patent application of C. F. Quate et al, which was filed Sept. 16, 1985 under Ser. No. 776,291 on a "Leaky Rayleigh Wave Nozzleless Droplet Ejector".

Capillary surface waves (viz., those waves which travel on the surface of a liquid in a regime where the surface tension of the liquid is such a dominating factor that gravitational forces have negligible effect on the wave behavior) are attractive for nozzleless liquid ink printing and similar applications because of their periodicity and their relatively short wavelengths. As a practical guideline, surface waves having wavelengths of less than about 1 cm. generally are essentially unaffected by gravitational forces because the forces that arise from surface tension dominate the gravitational forces. Thus, the spatial frequency range in which capillary waves exist spans and extends well beyond the range of resolutions within which non-impact printers normally operate. To facilitate the development of capillary wave printers, a copending and commonly assigned U.S. patent application of Elrod et al, which was filed Apr. 17, 1986 under Ser. No. 853,252 on "Spatially Addressable Capillary Wave Droplet Ejectors" describes methods and means for spatially addressing individual crests of a capillary wave so that droplets of liquid (e.g., ink can be ejected from selected crests of the wave on command.

As is known, a capillary wave is generated by mechanically, electrically, acoustically, thermally, pneumatically, or otherwise periodically perturbing the free surface of a volume of liquid at a suitably high excitation frequency, $\omega_e$. If the amplitude of this oscillating pressure equals or exceeds a critical "onset" amplitude level, one or more standing capillary waves are generated on the free surface of the liquid. Such waves are produced by a parametric excitation of the liquid, so their frequency, $\omega_{sc}$, is equal to one half the excitation frequency, (i.e., $\omega_{sc}=\omega_e/2$). The parametric process which is involved is described in substantial detail in the published literature with reference to a variety of liquids and a wide range of operating conditions. See, for example, Eisenmenger, W., "Dynamic Properties of the Surface Tension of Water and Aeguous Solutions of Surface Active Agents with Standing Capillary Waves in the Frequency Range from 10 kc/s to 1.5 Mc/s", Acustica, Vol. 9, 1959, pp. 327–340.

While the detailed physics of standing capillary surface waves are beyond the scope of this invention, it is noted that they are periodic and generally sinusoidal at lower amplitudes, and that they retain their periodicity but become non-sinusoidal as their amplitude is increased. As discussed in more detail hereinbelow, printing is facilitated by operating in the upper region of the amplitude range, where the waves have relatively high, narrow crests alternating with relatively shallow, broad troughs.

Standing capillary surface waves have been employed in the past to more or less randomly eject droplets from liquid filled reservoirs. For example, medicinal inhalants are sometimes dispensed by nebulizers which generate standing waves of sufficient amplitude to produce a very fine mist, known as an "ultrasonic fog". See Boucher, R. M. G. and Krueter, J., "The Fundamentals of the Ultrasonic Atomization of Medicated Solutions," Annals of Allergy, Vol. 26, November 1968, pp. 591–600. However, standing waves do not necessarily produce an ultrasonic fog. Indeed, Eisenmenger, supra at p. 335, indicates that the excitation amplitude required for the onset of an ultrasonic fog is about four times the excitation amplitude required for the onset of a standing capillary wave, so there is an ample tolerance for generating a standing capillary surface wave without creating an ultrasonic fog.

As will be appreciated, there are fundamental control problems which still have to be solved to provide a capillary surface wave printer. In contrast to the nonselective ejection behavior of known capillary wave droplet ejectors, such as the aforementioned nebulizers, the printing of a two dimensional image on a recording medium requires substantial control over the spatial relationship of the individual droplets which are deposited on the recording medium to form the image. For instance, in the case of a line printer, this control problem may be viewed as being composed of a spatial control component along the tangential or "line printing" axis of the printer and of a timing component along its sagittal or "cross-line" axis.

SUMMARY OF THE INVENTION

Therefore, in accordance with the present invention, provision is made for spatially stabilizing standing capillary surface waves in fixed and repeatable locations with respect to stationary external references. More or less conventional means can be employed to excite such a wave on the free surface of a volume of liquid. In keeping with this invention, however, the wave propagation characteristics of the free surface of the liquid are periodically varied in a spatially stable manner at a spatial frequency equal to the spatial frequency of the standing wave or a subharmonic thereof, thereby locking the crests and troughs of the standing wave in predetermined spatial locations. A spatially periodic pattern of notches in a wall or base plate bounding the free surface of the liquid may be employed to physically modulate its wave propagation characteristics at a suitable spatial frequency. Or, freely propagating secondary capillary surface waves may be launched from spatially periodic sites along the free surface of the liquid to actively modulate its wave propagation characteristics at the desired spatial frequency.

BRIEF DESCRIPTION OF THE DRAWINGS

Further objects and advantages of this invention will become apparent when the following detailed description is read in conjunction with the attached drawings, in which.

DETAILED DESCRIPTION OF THE ILLUSTRATED EMBODIMENTS

Figure 1:
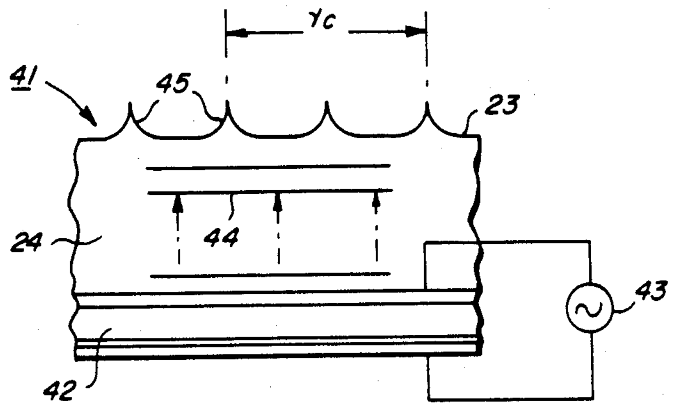
FIG. 1 is a simplified and fragmentary sectional view of a more or less conventional ultrasonic generator for generating standing capillary surface waves.
Figure 2:
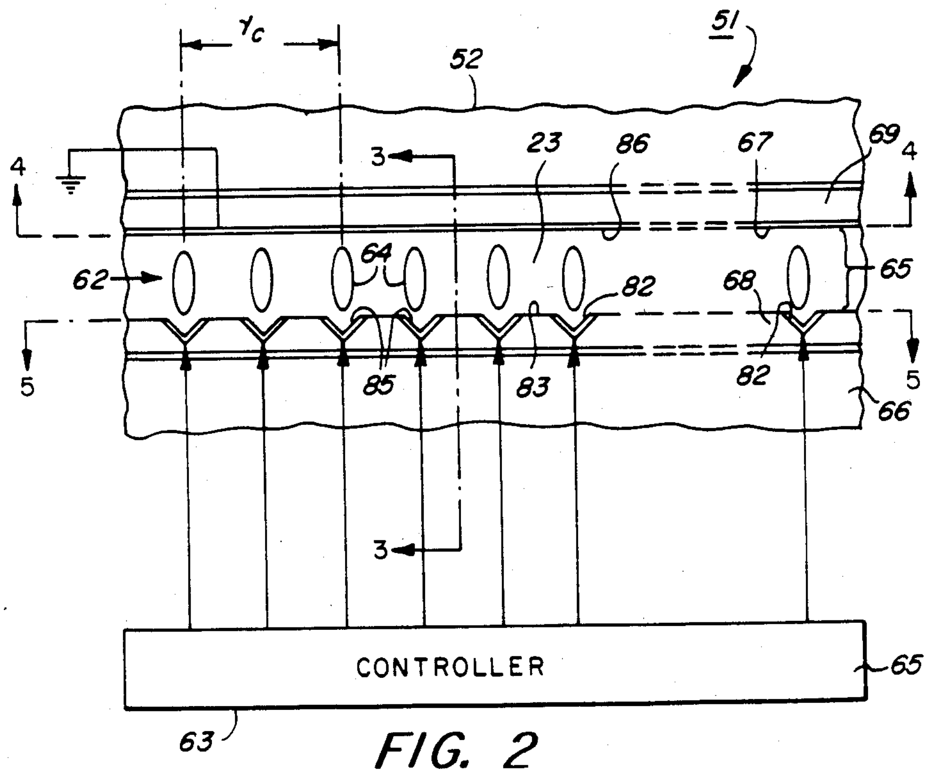
FIG. 2 is a simplified and fragmentary plan view of a capillary wave print head which is constructed in accordance with one embodiment of the present invention.

While the invention is described in some detail hereinbelow with the reference to certain illustrated embodiments, it is to be understood that there is no intent to limit it to those embodiments. On the contrary, the aim is to cover all modifications, alternatives and equivalents falling within the spirit and scope of the invention as defined by the appended claims. To simplify the disclosure, like elements are identified in the drawings by like reference numerals.

Turning now to the drawings, and at this point especially to FIG. 1, there is a generally conventional standing capillary surface wave generator 41 comprising a rf or near rf power supply 43 for driving a piezoelectric transducer 42 which is submerged in pool of liquid 24 at a predetermined excitation frequency, $\omega_e$. The peak-to-peak output voltage swing of the power supply 43 is selected to cause the transducer to radiate the free surface 23 of the liquid 24 with an ultrasonic pressure wave 44 having an essentially constant ac amplitude at least equal to the critical "onset" or threshold level for the production of a standing capillary surface wave 45 on the surface 23. For printing applications and the like, the amplitude of the pressure wave 44 advantageously is well above the critical threshold level for the onset of a standing wave, but still below the threshold level for the ejection of droplets. In other words, the capillary wave 45 preferably is excited to an "incipient" energy level, just slightly below the destabilization threshold of the liquid 24, thereby reducing the amount of additional energy that is required to free droplets from the crests of the wave 45. As will be seen, the pressure wave 44 may be an unconfined plane wave, such as shown, or it may be confined, such as in the embodiments discussed hereinbelow. An unconfined pressure wave 44 will more or less uniformly illuminate the free surface 23 of the liquid 24 over an area having a length and width comparable to that of the transducer 42.

Figure 3:
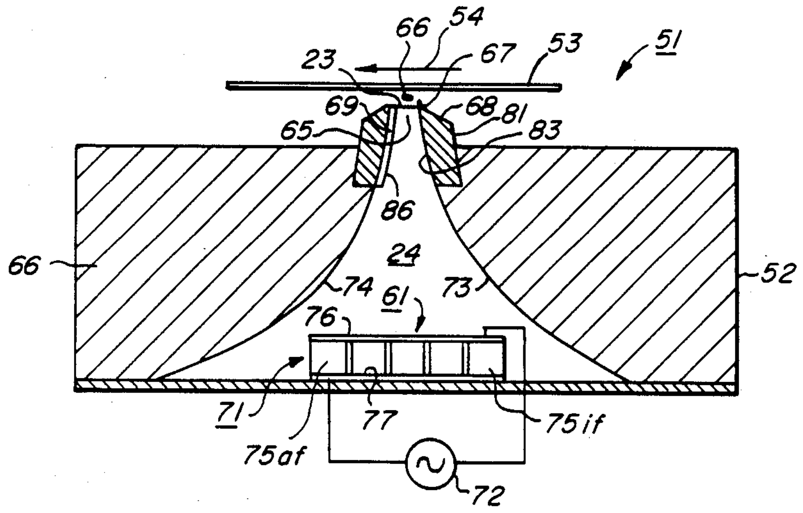
FIG. 3 is a fragmentary sectional view, taken along the line 2—2 in FIG. 2, to schematically illustrate a printer comprising the print head shown in FIG. 2.

Referring now to FIGS. 2-5, there is a line printer 51 (shown only in relevant part) having a liquid ink print head 52 for printing an image on a suitable recording medium 53, such as a sheet or web of plain paper. As in other line printers, the print head 52 extends across essentially the full width of the recording medium 53 which, in turn, is advanced during operation (by means not shown) in an orthogonal or cross-line direction relative to the print head 52, as indicated by the arrow 54 (FIG. 3). The architecture of the printer 51 imposes restrictions on the configuration and operation of its print head 52, so it is to be understood that the printer 51 is simply an example of an application in which the features of this invention may be employed to substantial advantage. It will become increasingly evident that the broader features of this invention are not limited to printing, let alone to any specific printer configuration.

Figure 5:
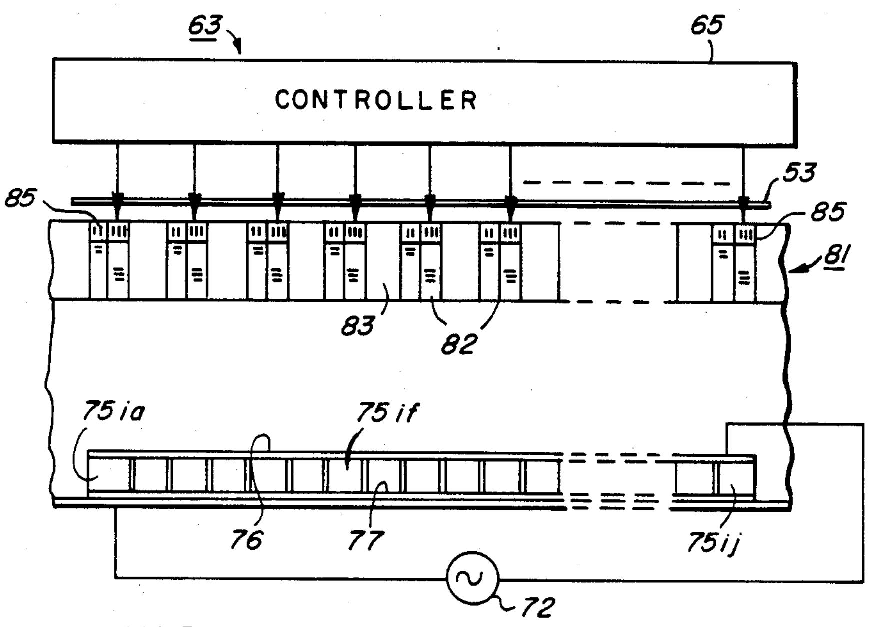
FIG. 5 is still another fragmentary sectional view, taken along the line 5—5 in FIG. 2.

As illustrated, the print head 52 comprises a wave generator 61 for generating a standing capillary surface wave 62 on the free surface 23 of a pool of liquid ink 24, together with an addressing mechanism 63 for individually addressing the crests 64 of the capillary wave 62 under the control of a controller 65. The wave generator 61 excites the capillary wave 62 to a subthreshold amplitude level, such as an "incipient" amplitude level as previously described, so the surface 23 supports the wave 62 without being destabilized by it. The addressing mechanism 63, in turn, selectively destabilizes one or more of the crests 64 of the wave 62 to free or eject droplets of ink (such as shown in FIG. 5 at 66) therefrom on command. To accomplish that, the addressing mechanism 63 suitably increases the amplitude of each of the selected crests 64 to a level above the destabilization threshold of the ink 24. As will be seen, the selected crests 64 may be addressed serially or in parallel, although parallel addressing is preferred for line printing.

For line printing, the capillary wave 62 is confined to a narrow, tangentially elongated channel 65 which extends across substantially the full width or transverse dimension of the recording medium 53. The sagittal dimension or width of the channel 65 is sufficiently narrow (i.e., approximately one-half of the wavelength, $\lambda_c$, of the capillary wave 62) to suppress unwanted surface waves (not shown), so the wave 62 is the only surface wave of significant amplitude within the channel 65. For example, as shown, the free surface 23 of the ink 24 may be mechanically confined by an acoustic horn 66 having a narrow, elongated mouth 67 for defining the channel 65. To assist in confining the capillary wave 62 to the channel 65, the upper front and rear exterior shoulders 68 and 69, respectively, of the horn 66 desirably come to sharp edges at its mouth 67 and are coated or otherwise treated with a hydrophobic or an oleophobic to reduce the ability of the ink 24 to wet them. Alternatively, a solid acoustic horn (not shown), could be employed to acoustically confine the capillary wave 62 to the channel 65. See the aforementioned Lovelady et al. '547 patent.

For generating the standing capillary wave 62, the wave generator 61 comprises an elongated piezoelectric transducer 71 which is acoustically coupled to the pool of ink 24, such as by being submerged therein approximately at the base of the horn 66. A rf or near rf power supply 72 drives the transducer 71 to cause it to produce a relatively uniform acoustic field across essentially its full width. The output frequency of the power supply 72 is selected to cause the wavelength, $\lambda_c$, of the standing wave 62 (or of a subharmonic thereof) to be approximately twice the desired center-to-center displacement or pitch, p, of adjacent pixels in the printed image (i.e., $p=\lambda_c/2N$, where N is a positive integer). Typically, the transducer 71 is substantially wider than the mouth 67 of the horn 66. Thus, the horn 66 is composed of a material having a substantially higher acoustic impedance than the ink 23 and is configured so that its forward and rearward inner sidewalls 73 and 74, respectively, are smoothly tapered inwardly toward each other for concentrating the acoustic energy supplied by the transducer 71 as it approaches the free surface 23 of the ink 24.

Figure 4:
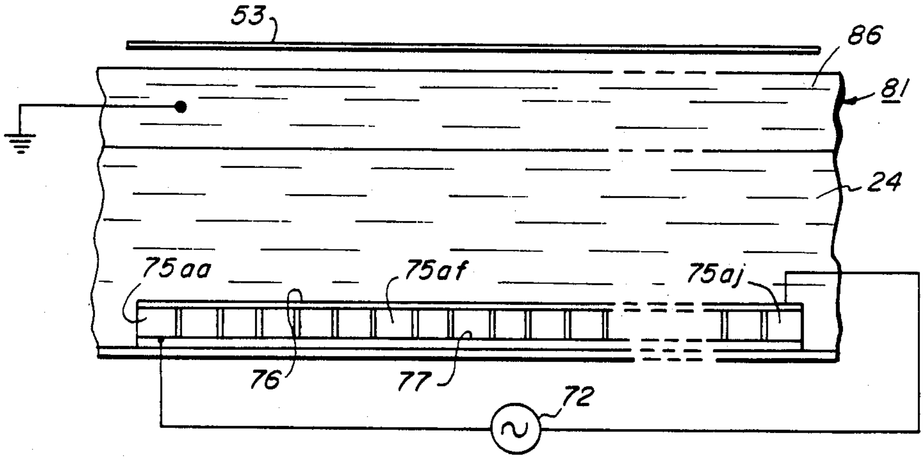
FIG. 4 is another fragmentary sectional view, taken along the line 4—4 in FIG. 2, to further illustrate the print head.

Advantageously, the transducer 71 operates without any substantial internal flexure, despite its relatively large radiating area, thereby enhancing the spatial uniformity of the acoustic field it generates. To that end, as shown in FIGS. 3–5, the transducer 71 suitably comprises a two dimensional planar array of densely packed, mechanically independent, vertically poled, piezoelectric elements 75*aa*–75*ij*, such as PZT ceramic elements, which are sandwiched between and bonded to a pair of opposed, thin electrodes 76 and 77. The power supply 72 is coupled across the electrodes 76 and 77 to excite the piezoelectric elements 75*aa*–75*ij* in unison, but the surface area of the individual elements 75*aa*–75*ij* is so small that there is no appreciable internal flexure of any of them.

In accordance with the present invention, provision is made for reliably and repeatedly stabilizing the longitudinal wave structure (i.e., the crests and troughs) of the standing wave 62 in a fixed spatial position lengthwise of the print head 52, so that there is no significant motion of its crests 64 laterally with respect to the recording medium 53 as a function of time. To accomplish that, the wave propagation characteristics of the free surface 24 of the ink 23 are periodically varied in a spatially stable manner along the length of the print head 52 at a spatial frequency equal to the spatial frequency of the capillary wave 62 or a subharmonic thereof. For example, a collar-like insert 81 (FIG. 3) suitably is employed to form the mouth 67 of the horn 66, and a periodic pattern of generally vertical, notches 82 are etched or otherwise cut into the forward inner sidewall 83 of the collar 81 on centers selected to cause the crests 64 of the capillary wave 62 to preferentially align with the notches 82. Advantageously, the notches 82 are formed photolithographically. See, Bean, K. E., "Anisotropic Etching of Silicon," *IEEE Transactions on Electron Devices*, Vol. ED-25, No. 10, October 1978, pp. 1185–1193.

The addressing mechanism 63 may be a discrete device or a scanner for freeing droplets 66 (FIG. 3) from one or more selected crests 64 of the capillary wave 62, either by reducing the surface tension of the liquid within the selected crests 64, such as by selectively heating it or spraying it with ions, or by increasing their amplitude sufficiently to destabilize them. For example, as shown in FIGS. 2–5, the addressing mechanism 63 comprises a discrete array of addressing electrodes 85, which are seated in the wave stabilizing notches 82 to align with the crests 64 of the wave 62, together with an elongated counter electrode 86, which is supported on the opposite inner sidewall of the collar 81. One of the advantages of providing the collar 81 for the horn 66 is that entirely conventional processes may be employed to overcoat the addressing electrodes 85 and the counter electrode 86 on its forward and rearward sidewalls. As will be seen, the addressing electrodes 85 and their counter electrode 86 are relatively shallowly immersed in the ink 24.

Figure 6:
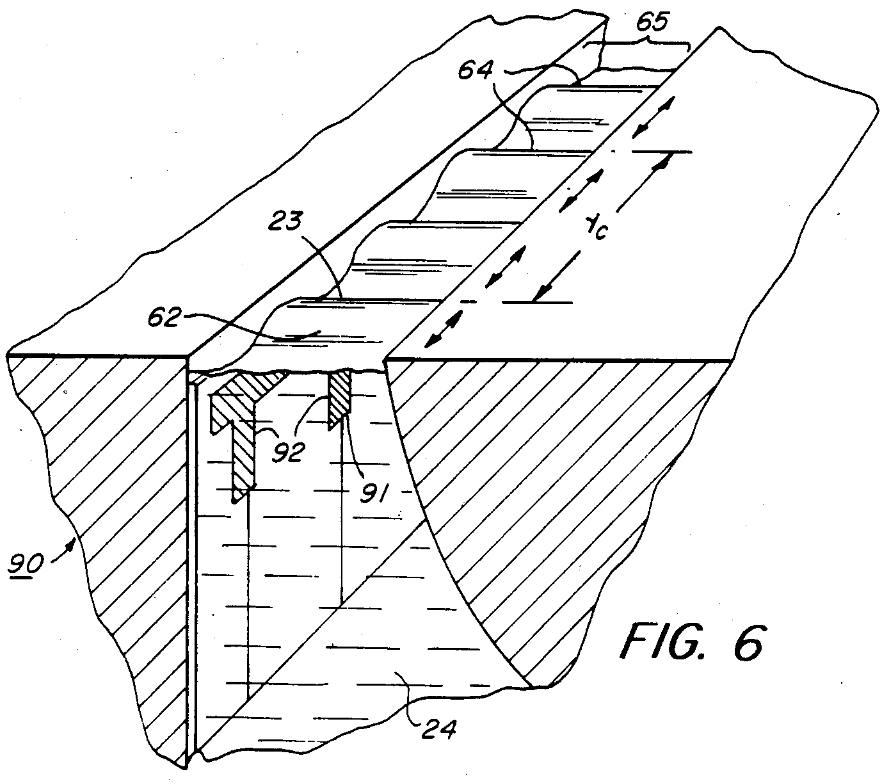
FIG. 6 is a simplified and fragmentary isometric view of an alternative embodiment of this invention.
Figure 7:
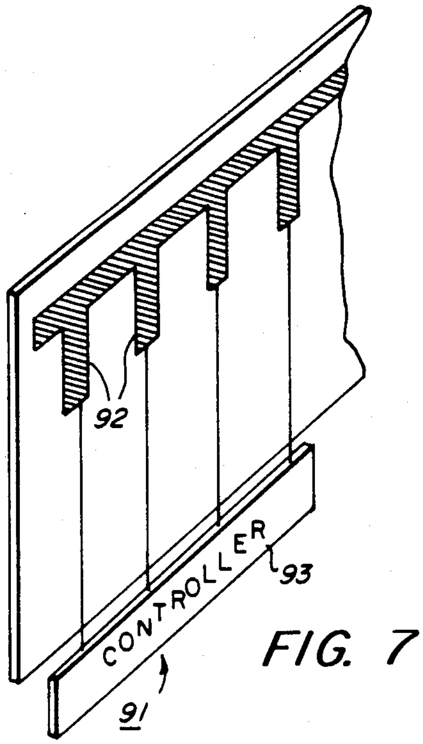
FIG. 7 is an enlarged, fragmentary isometric view of the wave stabilizing mechanism for the print head shown in FIG. 6.

A print head 90 having an active mechanism 91 for spatially stabilizing the wave structure of the standing capillary wave 62 and for selectively addressing its individual crests 64 is shown in FIGS. 6 and 7. In this embodiment, both of those functions are performed by an array of discrete, high speed, resistive heating elements 92 which are shallowly immersed in the ink 24 and aligned longitudinally of the capillary wave 62 on generally equidistant centers. For example, the heating elements 92 may be fast rise time/fast fall time resistive heaters, such as are used in so-called "bubble jet" devices and may be supported on an inner sidewall of the print head 90. The center-to-center displacement of the heating elements 92 is selected to be equal to one half the wavelength of the capillary wave 62 (i.e., $\lambda_c/2$) or an integer multiple thereof, so that the controller 93 may (1) spatially modulate the heating elements 92 at the spatial frequency of the capillary wave 62 or at a subharmonic thereof, and (2) selectively modulate the heating elements 92 as a function of time to cause them to individually address selected crests 64 of the capillary wave 62. Freely propagating capillary waves (i.e., referred to hereinabove as "secondary" waves) are launched from the modulated heating elements 92 on account of the localized expansion and contraction of the ink 24. Consequently, the spatial modulation of the heating elements 92 periodically varies the wave propagation characteristics of the free surface 23 of the ink 24 at a suitable spatial frequency to cause the crests 64 of the capillary wave 62 to preferentially align in a fixed spatial location relative to the heating elements 92.

Figure 8:
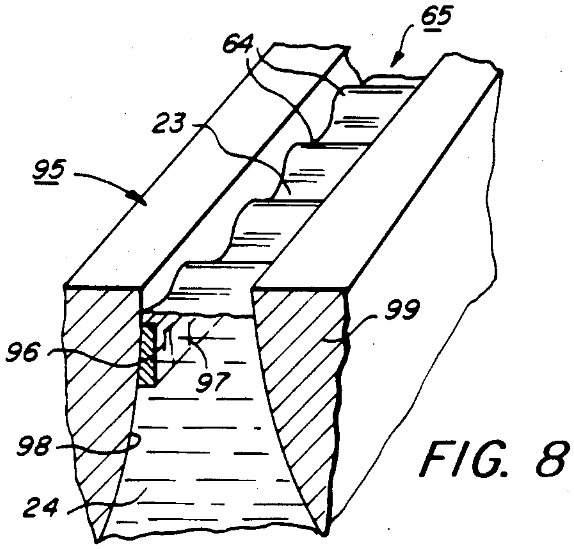
FIG. 8 is a simplified and fragmentary isometric view of a print head constructed in accordance with still another embodiment of the present invention.
Figure 9:
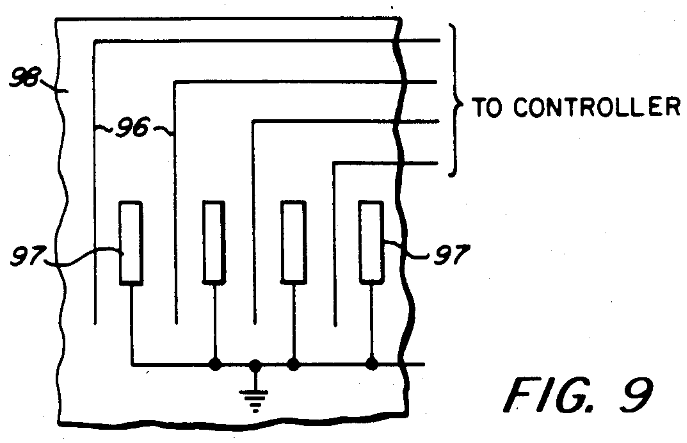
FIG. 9 is an enlarged, fragmentary elevational view of the interdigitated electrodes used in the wave stabilizing mechanism for the print head shown in FIG. 8.

Various alternatives will be evident for spatially addressing selected crests 64 of the capillary wave 62 and/or for spatially stabilizing its wave structure. For example, as shown in FIGS. 8 and 9, there is a print head 95 having a plurality of interdigitated discrete addressing electrodes 96 and ground plane electrodes 97 which are deposited on or otherwise bonded to an inner sidewall 97 of an acosutic horn 98. The print head 97 utilizes the operating principles of the addressing mechanism 63 shown in FIGS. 2–5 to address selected crests 64 of the wave 62, but its individual addressing electrodes 96 also are spatially modulated to spatially stabilize the structure of the capillary wave 62 with respect to the addressing electrodes 96 as previously described with reference to FIGS. 6 and 7.

Figure 10:
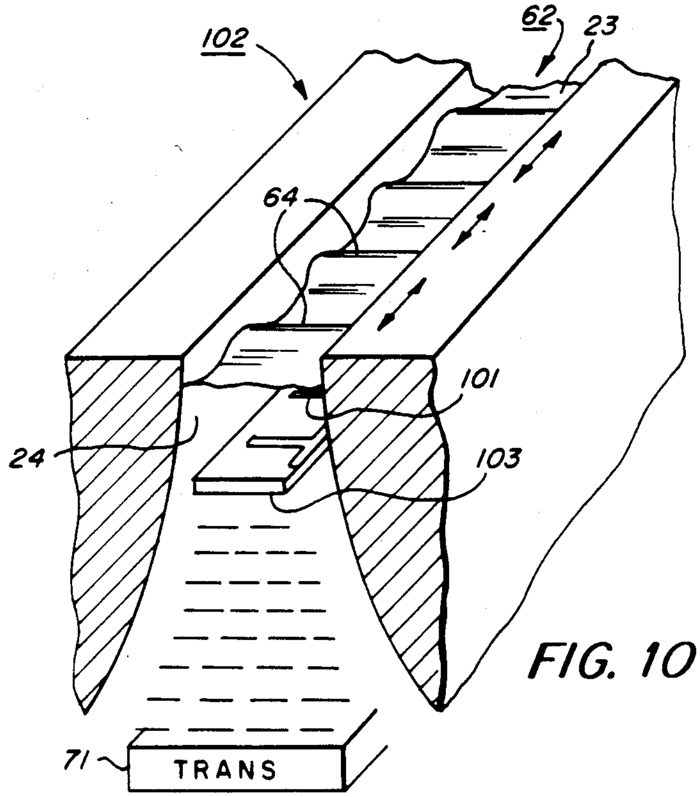
FIG. 10 is a simplified and fragmentary isometric view of a print head having a transversely mounted wave stabilizing mechanism.

Another possible alternative is shown in FIG. 10 where discrete electrical or thermal addressing/wave stabilizing elements 101 for a print head 102 are supported on a suitable substrate, such as a Mylar film 103, in a transverse orientation just slightly below the free surface 23 of the ink 24.

CONCLUSION

In view of the foregoing, it will now be understood that the present invention provides methods and means for locking standing capillary surface waves in predetermined and repeatable spatial locations. While the invention has important applications to liquid ink printing, it will be evident that it is not limited thereto.

What is claimed:

1. In a combination with a volume of liquid having a free surface, and means for generating a standing capillary wave on said free surface; said capillary wave having a periodic wave structure including crests and troughs; the improvement comprising another means for periodically varying a wave propagation characteristic of said free surface along at least one axis at a spatial frequency selected to cause the the crests of said standing wave to preferentially align at predetermined spatial locations along said axis.

2. The improvement of claim 1 wherein said other means comprises a plurality of substantially equidistantly separated notches formed in a surface which borders said free surface parallel to said axis.

3. The improvement of claim 2 wherein said liquid is disposed within an axially elongated acoustic horn having a relatively narrow collar bordering said free surface for confining said wave structure to said predetermined axis, said notches are etched into said collar, and an acoustic transducer means is disposed within said horn for radiating the free surface of said liquid with an ultrasonic pressure wave of sufficient amplitude to generate said standing wave.

4. The improvement of claim 3 wherein said transducer means is substantially coextensive with said horn along said axis, and said transducer means comprises a plurality of mechanically independent piezoelectric elements which are poled in a direction normal to said free surface, and means for exciting said piezoelectric elements in unison, whereby said pressure wave has a substantially uniform amplitude lengthwise of said horn.

5. The improvement of claim 3 further including a plurality of discrete addressing elements which are supported by said collar and aligned with respective ones of said notches to selectively address individual ones of said crests in parallel on command.

6. The improvement of claim 5 wherein said addressing elements are disposed within said notches.

7. The improvement of claim 6 further including a recording medium disposed adjacent the free surface of said liquid for receiving the droplets freed from the selected crests.

8. The improvement of claim 7 wherein said transducer means comprises a plurality of mechanically independent piezoelectric elements which are poled in a direction normal to said free surface, and means for exciting said piezoelectric elements in unison, whereby said pressure wave has a substantially uniform amplitude lengthwise of said horn.

9. The improvement of claim 1 wherein said other means comprises a plurality of capillary wave sources equidistantly separated along a surface which borders said free surface parallel to said axis, and means for spatially modulating said sources at said spatial frequency, thereby causing said sources to generate surface waves for preferentially aligning the crests of said standing wave with respective ones of said sources.

10. The improvement of claim 9 wherein said liquid is disposed within an axially elongated acoustic horn having a relatively narrow collar bordering said free surface for confining said wave structure to said predetermined axis, said sources are supported on said collar, and an acoustic transducer means is disposed within said horn for radiating the free surface of said liquid with an ultrasonic pressure wave of sufficient amplitude to generate said standing wave.

11. The improvement of claim 10 wherein said transducer means is substantially coextensive with said horn along said axis, and said transducer means comprises a plurality of mechanically independent piezoelectric elements which are poled in a direction normal to said free surface, and means for exciting said piezoelectric elements in unison, whereby said pressure wave has a substantially uniform amplitude lengthwise of said horn.

12. The improvement of claim 10 further including discrete addressing means for selectively addressing individual ones of said crests in parallel on command.

13. The improvement of claim 12 wherein said addressing means comprise means for further modulating said sources as a function of time.

14. The improvement of claim 13 further including a recording medium disposed adjacent the free surface of said liquid for receiving the droplets freed from the selected crests.

15. The improvement of claim 14 wherein said transducer means comprises a plurality of mechanically independent piezoelectric elements which are poled in a direction normal to said free surface, and means for exciting said piezoelectric elements in unison, whereby said pressure wave has a substantially uniform amplitude lengthwise of said horn.

* * * * *